United States Patent
Grossman

[19]

[11] Patent Number: 5,963,720
[45] Date of Patent: Oct. 5, 1999

[54] METHOD AND SYSTEM FOR EXPEDITING TRANSFER OF DATA OVER A NETWORK USING AN ADDITIONAL FIELD

[75] Inventor: Leonid Grossman, Cupertino, Calif.

[73] Assignee: Advanced Micro Devices, Inc., Sunnyvale, Calif.

[21] Appl. No.: 08/696,424

[22] Filed: Aug. 13, 1996

[51] Int. Cl.⁶ .................................................. G06F 15/16
[52] U.S. Cl. ................................... 395/200.8; 395/200.6
[58] Field of Search .................................. 395/872, 876, 395/200.6, 200.8, 200.64

[56] References Cited

U.S. PATENT DOCUMENTS

| | | | |
|---|---|---|---|
| 5,299,313 | 3/1994 | Peterson et al. | 395/200.64 |
| 5,303,344 | 4/1994 | Yokoyama et al. | 395/200.6 |
| 5,533,203 | 7/1996 | Fischer et al. | 395/872 |
| 5,729,681 | 3/1998 | Aditya et al. | 395/200.8 |
| 5,740,467 | 4/1998 | Chmielecki, Jr. et al. | 395/876 |
| 5,799,314 | 8/1998 | Provino et al. | 707/104 |

FOREIGN PATENT DOCUMENTS

| | | | |
|---|---|---|---|
| 621713 | 10/1994 | European Pat. Off. | H04L 29/06 |
| 632626 | 1/1995 | European Pat. Off. | H04L 29/06 |

OTHER PUBLICATIONS

George R. Davis, The Local Network Handbook, McGraw Hill, pp. 26–28, Dec. 1982.

*Primary Examiner*—Parshotam S. Lall
*Assistant Examiner*—Patrice L. Winder
*Attorney, Agent, or Firm*—Sawyer & Associates

[57] ABSTRACT

A system and method for expediting data processing in a computer system including a network controller and a driver is disclosed. The method and system first provide a hardware structure. The hardware structure has a first plurality of fields and corresponds to a second structure. The second structure has a second plurality of fields. The first plurality of fields of the hardware structure has at least one field more than the second plurality of fields. The method and system then allow the driver to utilize the at least one extra field for increasing efficiency of data processing.

30 Claims, 3 Drawing Sheets

200

5,963,720

METHOD AND SYSTEM FOR EXPEDITING TRANSFER OF DATA OVER A NETWORK USING AN ADDITIONAL FIELD

FIELD OF THE INVENTION

The present invention relates to network controllers and more particularly to a method and system for expediting data processing in a computer system utilizing network controllers.

BACKGROUND OF THE INVENTION

Network controllers perform several tasks, including controlling the transmission to and reception of data from a network. Typically, when a transmission of data is to occur, data received from the operating system in one form must be translated to a form recognizable by the network controller and the network. Similarly, data received from the network must be translated into data which the operating system can understand. These packets must also be indexed in a manner that allows the network controller to pass the packet between the operating system and the network.

In the operating system, packets are typically indexed using a protocol structure. For example, a typical protocol structure for an ETHERNET packet includes the virtual address, the data length, and a handler. The handler contains protocol parameters that identify the packet to the protocol in a unique way. This protocol structure must be converted into a form usable by the network controller.

In order to transmit the packet, the conventional network drivers ("drivers") store the packet on the network controller prior to being sent to the network. In order to index the packet, conventional drivers convert the protocol structure into a hardware specific structure. The hardware structure, the hardware descriptor, contains the data length, the status of the packet, and the physical address of the packet. The physical address denotes where the packet is stored. Thus, in order to transmit the packet, the typical network controllers use the physical address of the packet.

Once the transmission of a particular packet has finished, the driver typically receives a hardware interrupt and then issues a call to the protocol indicating that transmission is complete. The driver has to submit the handler as a parameter for this call. However, because the protocol identifies data packets using handlers, while the network controller uses the physical address, the driver may not know to which handler, or packet, the interrupt refers. In other words, the driver does not know the protocol structure which corresponds to a particular hardware descriptor the hardware just completed. If the driver cannot specify (to the protocol) the handler for a particular packet, either the handler cannot be reused or the data corresponding to the handler may be accidentally overwritten.

In order to identify which protocol structure corresponds to a particular hardware descriptor, conventional drivers use a software table. Typical drivers use a table which indexes the physical address in the hardware descriptor with the handler of the protocol structure. Software searches the table for the handler corresponding to the physical address of a packet that has completed transmission. Only after the handler has been found can the driver release the handler to the protocol.

In addition to the transmit process discussed, other processes carried out by the network controller also require a software table search in order to pass data between the network, the network controller, and the operating system. For example, a receive of a packet will also require a search of a software table before a message can be released to the operating system in a form the operating system can understand.

To search the software table, many conventional systems use a linear search. In addition, software tables may possess up to several hundred entries. Consequently, the search may take a relatively long time or be inefficient, thereby slowing data processing. In addition, because the table is implemented in software, changes in the protocol may require changes in the implementation of the table to preserve current operating efficiency. Although the software table may be changed to adapt to the new protocol, implementation of the software table may be time consuming or difficult.

Accordingly, what is needed is a system and method for expediting data processing. The present invention addresses such a need.

SUMMARY OF THE INVENTION

The present invention provides a system and method for expediting data processing in a computer system including a network controller and a driver. The method and system first provide a hardware structure. The hardware structure has a first plurality of fields and corresponds to a second structure. The second structure has a second plurality of fields. The first plurality of fields of the hardware structure has at least one field more than the second plurality of fields. The method and system then allow the driver to utilize the at least one extra field for increasing efficiency of data processing.

According to the system and method disclosed herein, the present invention increases efficiency of network controllers, thereby increasing overall system performance. In addition, the driver is made adaptable to a greater variety of protocols, thereby simplifying driver implementation.

DETAILED DESCRIPTION OF THE INVENTION

The present invention relates to an improvement in network controllers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. However, nothing prevents the use of the method and system for other operations. Thus, the present invention is not intended to be limited to the embodiment shown but is to be accorded the widest scope consistent with the principles and features described herein.

Figure 1:
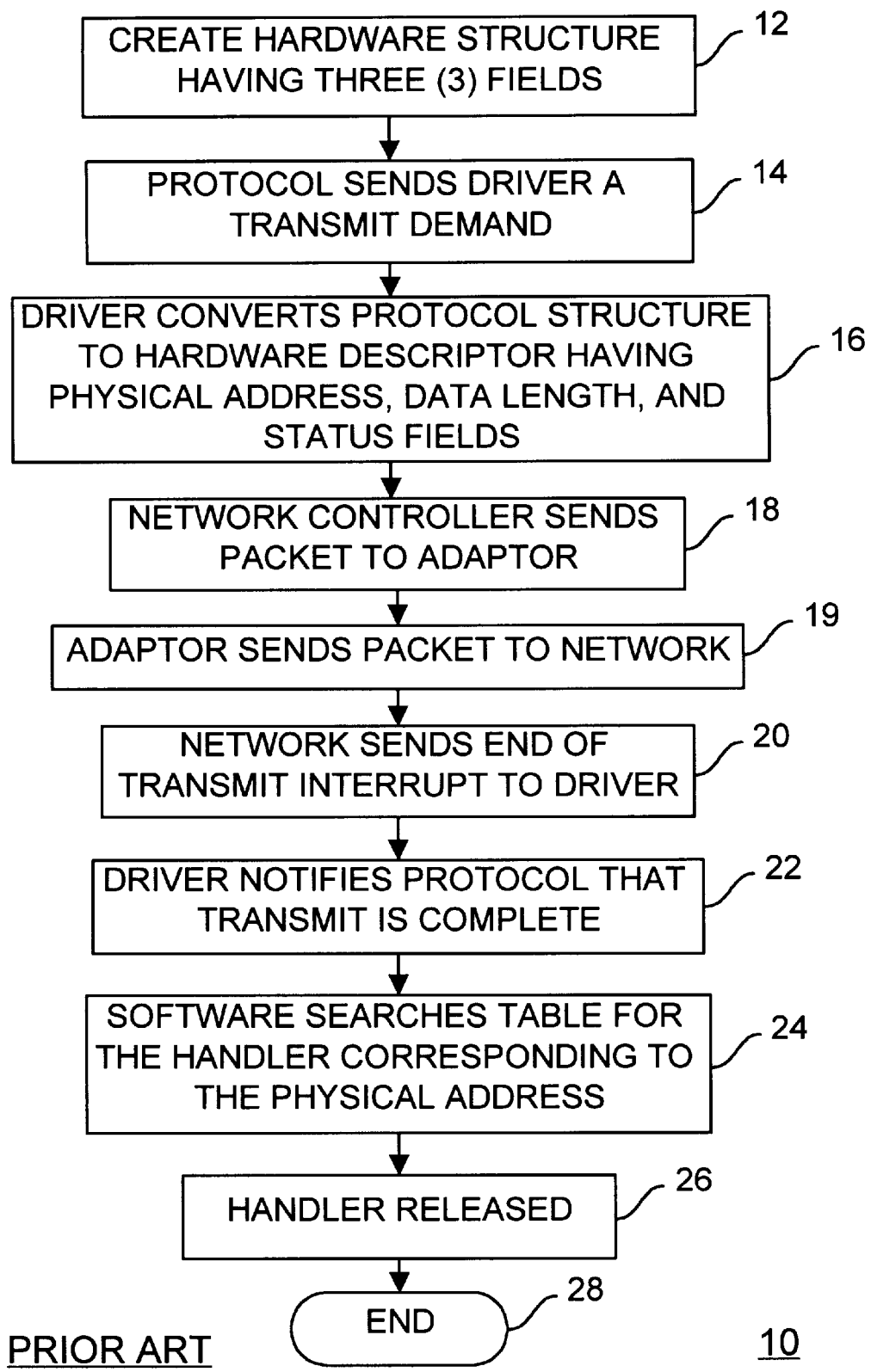
FIG. 1 is a flow chart of a conventional method for transmitting a data packet.

FIG. 1 is a flow chart of a conventional method 10 for transmitting a data packet. In order to transmit the packet, a conventional driver typically writes to a hardware descriptor having three fields, via step 12. Typically, the fields of the hardware descriptor correspond to the fields in the protocol structure used by the protocol to describe the packet. In a protocol having ETHERNET packets, the protocol structure has a virtual address, a data length, and a handler. The handler uniquely identifies the packet to the protocol.

Next, a transmit demand is typically issued from the protocol to the driver in step 14. In conventional systems, the driver then converts the protocol structure into a hardware descriptor via step 16. The three fields in the hardware descriptor typically contain the data length, the status of the packet, and the physical address of the packet. The physical address denotes where the packet is stored on the network controller or in the system memory.

In order to transmit the packet, typical network controllers then send the packet at the appropriate physical address to an adapter via step 18. The adapter sends the packet to the network in step 19. Once the transmission of a particular packet has finished, the driver typically notifies the protocol that transmission is complete via step 22.

Conventional drivers use a transmit interrupt signal to indicate the completion of transmission of a particular packet. In order to identify which handler corresponds to the interrupt signal, conventional systems search a software table for the handler corresponding to the physical address via step 24. Once the correct handler is found, it can be released via step 26. Finally, the transmit is terminated in step 28.

Although the method discussed above allows for transmission of a packet, those with ordinary skill in the art will realize that the software table search step, step 24, may require a relatively long time and may make the implementation of the driver more difficult. Step 24 is carried out because the protocol identifies data packets using handlers, while the network controller uses the physical address. Consequently, without software table searching step 24, the driver may not know which handler return to the protocol. In other words, the driver may not know the protocol structure which corresponds to a particular hardware descriptor. If the driver cannot identify the handler for the transmitted packet, the protocol cannot release the handler. When the protocol cannot release a handler, either the handler cannot be reused or the data corresponding to the handler may be accidentally overwritten.

Typically, the software table accessed in step 24 indexes the physical address in the hardware descriptor with the handler of the protocol structure. Many conventional systems use a linear search to complete step 24 and have tables with up to several hundred entries. Consequently, the search may take a relatively long time or be inefficient. Data processing may, therefore, be slowed.

In addition, because the table is implemented in software, changes in the protocol may require changes in the implementation of the table to preserve current operating efficiency. Protocol architectures undergo changes more often than driver architectures. Consequently, each time the protocol changes, a developer may be forced to either implement a new software table and search, or accept reduced driver efficiency. New software implementations may require significant efforts to find a preferred search method and debug the method once it has been chosen.

The present invention provides for a method and system for expedited data processing in a system employing a network controller. The present invention will be described in terms of a transmit and a receive of a packet in ETHERNET and UNIX protocols. However, one of ordinary skill in the art will readily recognize that this method and system will operate effectively for other types of protocols and other operations.

Figure 2:
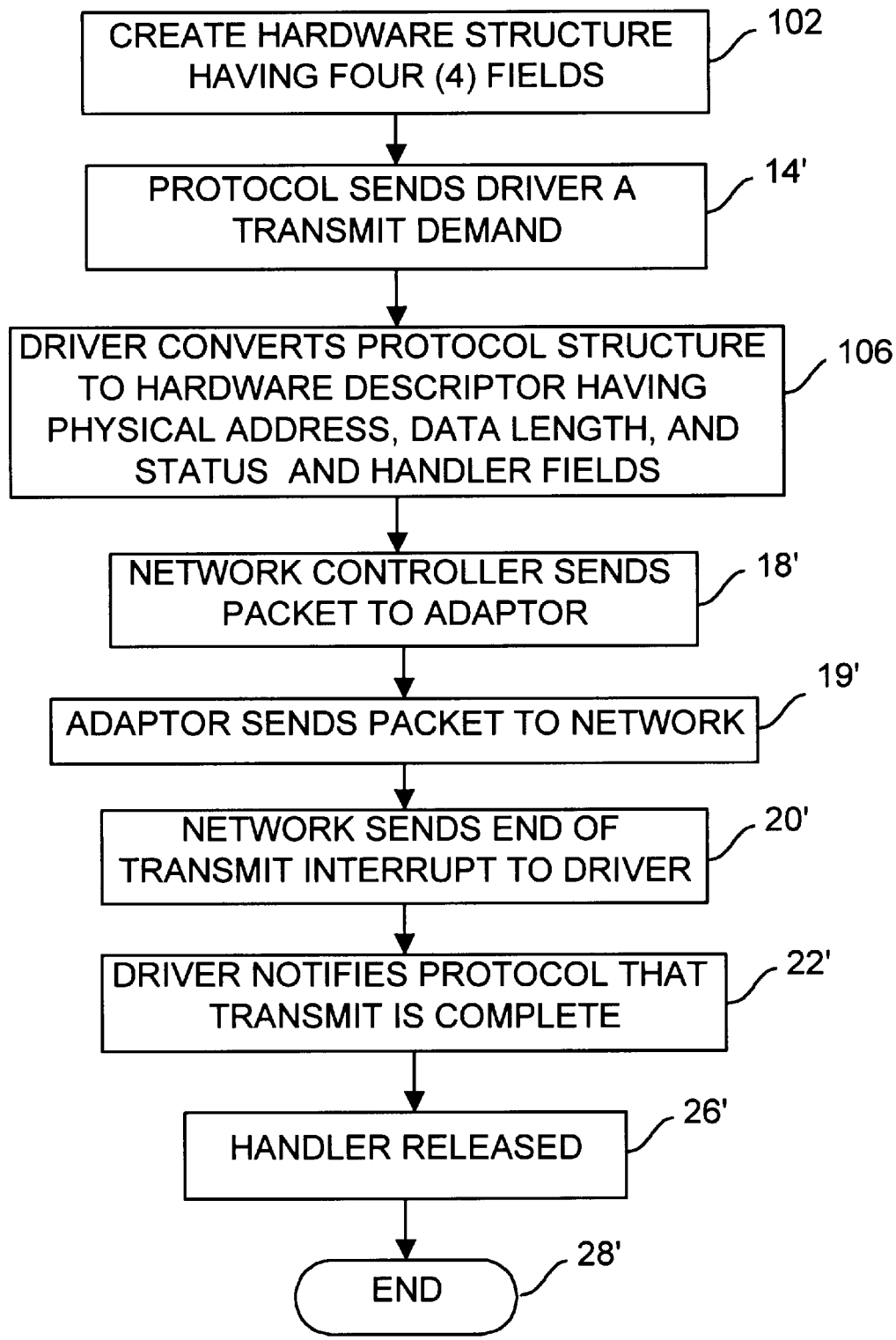
FIG. 2 is a flow chart depicting a method for transmitting a data packet in accordance with the method and system.

To more particularly illustrate the method and system in accordance with the present invention, refer now to FIG. 2 depicting a flow chart of a method 100 for transmitting a data packet in accordance with the method and system. The method 100 has several steps in common with the method 10 of FIG. 1. Similar steps in the method 100 are labeled as for the method 10 of FIG. 1.

Referring now to FIG. 2, the driver first creates a hardware descriptor having a data fields in addition to those used in conventional architecture via step 102. In the method 10 of FIG. 2, the hardware descriptor has a total of four fields. However, nothing prevents the hardware descriptor from having a different number of fields. The extra field provided in the hardware descriptor is for the driver's use and can be utilized for a variety of purposes. The method 100 could also provide more than one extra field for the driver's use. In the method 10 of FIG. 1, the extra field is 32 bits long and used to store the handler for the particular data packet. However, nothing prevents the use of an extra field of different size. Consequently, the driver converts the protocol structure to a hardware descriptor having a physical address, data length, status, and handler via step 106.

When the transmission is complete, the driver notifies the protocol via step 22'. In one embodiment, step 22' is carried out by a transmit interrupt call from the driver to the protocol. Because the hardware descriptor contains the handler, the protocol structure to which the call refers is known by the driver and the network controller. Thus, the transmit interrupt call may include information indicating the correct handler. Consequently, the method 10 does not require a search of a software table. Instead, the protocol may immediately release the proper handler via step 26'.

Conventional systems also require a software table and a search in order to process a receive of a data packet. For example, in a UNIX system employing streams architecture, an incoming packet from the network is uniquely identified by a message pointer. A receive descriptor includes the message pointer, a handler, and a data length. Prior to receiving the packet, the protocol is notified that the received message will be passed to the driver. Conventional drivers then typically create a hardware descriptor having fields for a physical address, a data length, and a status. The physical address typically corresponds to the data buffer in which the packet will be stored. When the packet is received, the driver places the packet into intermediate storage in the data buffer corresponding to the physical address. Because the streams architecture uses the message pointer to identify a particular message, the driver requires the message pointer in order to send the data in the buffer to the protocol. Conventional systems, therefore, may also require a search of a software table indexing the message pointer with the physical address.

Figure 3:
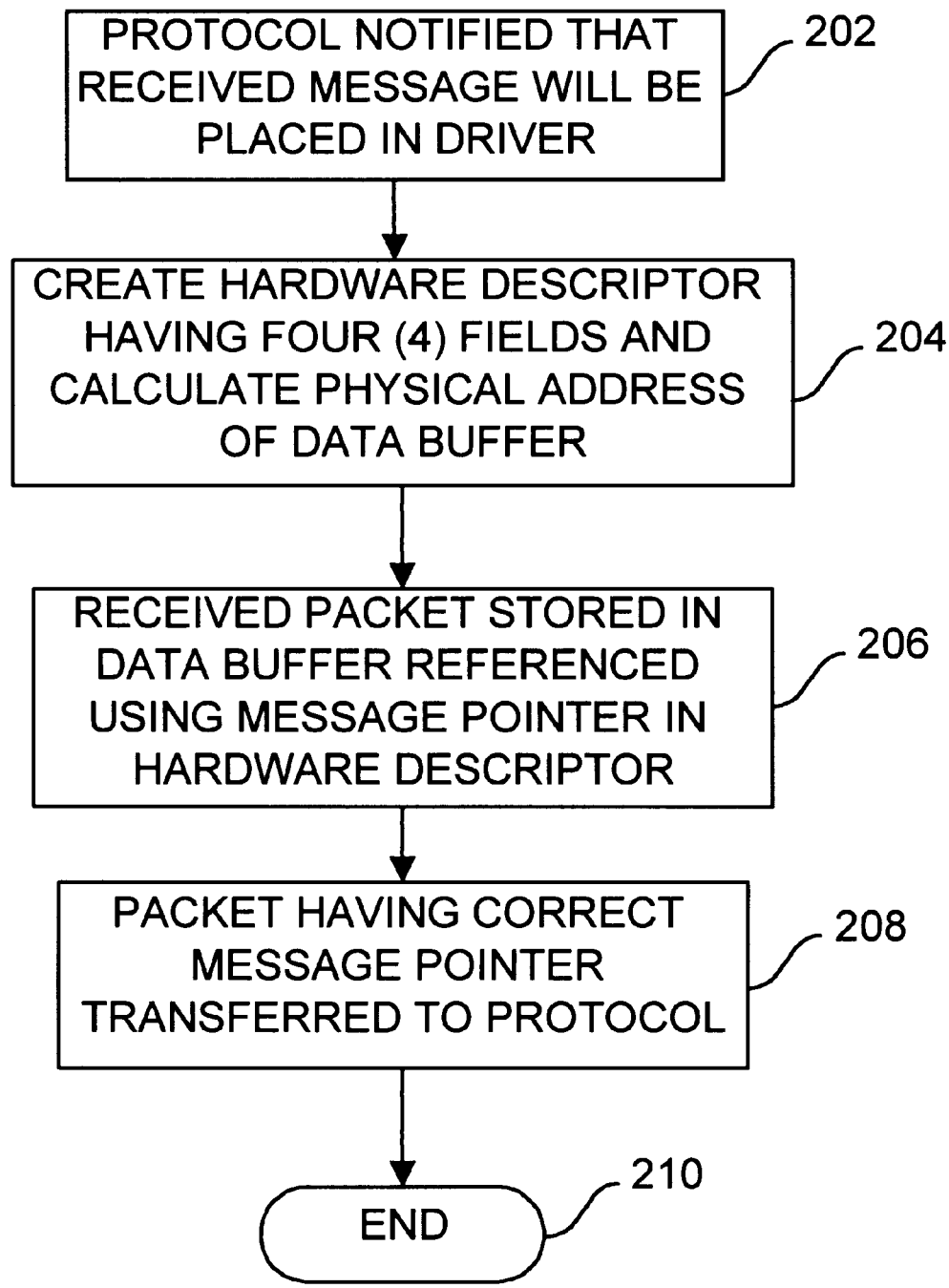
FIG. 3 is a flow chart of a method for receiving a data packet in accordance with the method and system.

FIG. 3 depicts a flow chart of a method 200 for receiving a data packet in a UNIX system using streams architecture in accordance with the method and system. As in conventional systems, prior to receiving the data packet, the protocol is notified that the packet will be placed in intermediate storage and passed to the driver via step 202. In step 204, the driver then creates a hardware descriptor having a physical address corresponding to the location of the buffer used for intermediate storage, a data length, a status, and an extra field for the driver's use.

In the method 200, the hardware descriptor has four fields. However, nothing prevents the use of a hardware descriptor having a different number of fields, or there being more than one extra field for the driver's use. The extra field created in the method 10 is 32 bits long and used to store the message pointer. Because the hardware descriptor contains the message pointer of the packet, the packet may then be immediately transferred to the protocol via step 208. Thus, a search of a software table is not required.

A method and system has been disclosed for expediting data processing in a computer system employing a network controller. The method and system utilize an extra field in a hardware structure for use by a driver. Because the extra field may be used to store information required to pass data between the protocol and the driver, a software table indexing information used by the driver with corresponding information used by the protocol is unnecessary. Because a search of a software table is not required in either a transmit or a receive of a data packet, data processing is made more efficient. In addition, the removal of the software table simplifies the implementation of a driver. Finally, because it is not necessary to provide a software table, the driver may adapt to changes in protocol structure without additional software or significant loss in driver efficiency.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for expediting data processing in a computer system including a network controller and a driver comprising the steps of:

(a) providing a hardware structure having a first plurality of fields, the hardware structure corresponding to a second structure, the second structure having a second plurality of fields, the first plurality of fields of the hardware structure having at least one field more than the second plurality of fields, the at least one field storing a handler during transmission of a data packet; and (b) utilizing the at least one extra field by the driver for increasing efficiency of data processing.

2. The method of claim 1 wherein the at least one field stores information identifying the data packet.

3. The method of claim 2 wherein the second structure comprises a protocol structure.

4. The method of claim 2 wherein the second structure comprises a receive structure.

5. The method of claim 4 wherein the at least one field further comprises a 32 bit long field.

6. The method of claim 2 wherein the at least one field further comprises a 32 bit long field.

7. A method for expediting data processing in a computer system including a network controller and a driver comprising the steps of:

(a) providing a hardware structure having a first plurality of fields, the hardware structure corresponding to a second structure, the second structure having a second plurality of fields, the first plurality of fields of the hardware structure having at least one field more than the second plurality of fields, the at least one field being 32 bits long and storing a handler during transmission of a data packet, the at least one field storing information identifying the data packet; and (b) utilizing the at least one extra field by the driver for increasing efficiency of data processing;

wherein the second structure further includes a protocol structure.

8. The method of claim 7 wherein at least a portion of the first plurality of fields store a physical address and a data length.

9. A method for expediting data processing in a computer system including a network controller and a driver comprising the steps of:

(a) providing a hardware structure having a first plurality of fields, the hardware structure corresponding to a second structure, the second structure having a second plurality of fields, the first plurality of fields of the hardware structure having at least one field more than the second plurality of fields, the at least one field being 32 bits long and storing a message pointer during a receive of the data packet; and (b) utilizing the at least one extra field by the driver for increasing efficiency of data processing;

wherein the second structure includes a receive structure.

10. The method of claim 9 wherein at least a portion of the first plurality of fields store a physical address and a data length.

11. A method for expediting data processing in a computer system including a network controller and a driver comprising the steps of:

(a) providing a hardware structure having a plurality of fields, at least one field of the plurality of fields for storing a handler during transmission of a data packet; and (b) utilizing the at least one field storing information identifying a data packet, the at least one field allowing the driver to expedite data processing.

12. The method of claim 11 wherein the hardware structure corresponds to a second structure and the second structure comprises a protocol structure.

13. The method of claim 11 wherein the hardware structure corresponds to a second structure and the second structure comprises a receive structure.

14. The method of claim 13 wherein the at least one field further comprises a 32 bit long field.

15. A method for expediting data processing in a computer system including a network controller and a driver comprising the steps of:

(a) providing a hardware structure having a plurality of fields, at least one field of the plurality of fields being 32 bits long and storing a handler during transmission of a data packet, the hardware structure corresponding to a second structure, the second structure including a protocol structure; and (b) utilizing the at least one field storing information identifying a data packet, the at least one field allowing the driver to expedite data processing.

16. The method of claim 15 wherein at least a portion of the plurality of fields store a physical address and a data length.

17. A method for expediting data processing in a computer system including a network controller and a driver comprising the steps of:

(a) providing a hardware structure having a plurality of fields, at least one field of the plurality of fields for storing a message pointer during a receive of a data packet, the hardware structure corresponding to a receive structure; and (b) utilizing the at least one field storing information identifying the data packet, the at least one field allowing the driver to expedite data processing.

18. The method of claim 17 wherein at least a portion of the plurality of fields store a physical address and a data length.

19. A driver comprising:

means for providing a hardware structure corresponding to a second structure, the hardware structure having a first plurality of fields, the second structure having a second plurality of fields, the first plurality of fields of the hardware structure having at least one field more than the second plurality of fields, the at least one field storing a handler during transmission of a data packet; and means for utilizing the at least one field to expedite data processing.

20. The driver of claim 19 wherein the at least one field stores information identifying the data packet.

21. The driver of claim 20 wherein the second structure comprises a receive structure.

22. The driver of claim 19 wherein the least one field further comprises a 32 bit long field.

23. A driver comprising:

means for providing a hardware structure corresponding to a second structure, the hardware structure having a first plurality of fields, the second structure including a protocol structure and having a second plurality of fields, the first plurality of fields of the hardware structure having at least one field more than the second plurality of fields, the at least one field storing a handler during transmission of a data packet and information identifying the data packet; and means for utilizing the at least one field to expedite data processing.

24. The driver of claim 23 wherein the first plurality of fields store a physical address and a data length.

25. A driver comprising:

means for providing a hardware structure corresponding to a second structure, the hardware structure having a first plurality of fields, the second structure including a receive structure and having a second plurality of fields, the first plurality of fields of the hardware structure having at least one field more than the second plurality of fields, the at least one field storing information identifying the data packet, the at least one field also storing a message pointer during a receive of the data packet; and means for utilizing the at least one field to expedite data processing.

26. The driver of claim 25 wherein at least a portion of the first plurality of fields store a physical address and a data length.

27. A driver comprising:

means for providing a providing a hardware structure having a plurality of fields, at least one field of the plurality of fields for storing a handler during transmission of a data packet; and means for utilizing the at least one field for storing information identifying the data packet, the at least one field allowing the driver to expedite data processing.

28. A driver comprising:

means for providing a providing a hardware structure having a plurality of fields, at least one field of the plurality of fields for storing a handler during transmission of a data packet, the hardware structure corresponding to a protocol structure; and means for utilizing the at least one field for storing information identifying the data packet, the at least one field allowing the driver to expedite data processing.

29. The driver of claim 28 wherein the second structure comprises a receive structure.

30. A driver comprising:

means for providing a providing a hardware structure having a plurality of fields, at least one field of the plurality of fields storing a message pointer during a receive of a data packet; and means for utilizing the at least one field for storing information identifying the data packet, the at least one field allowing the driver to expedite data processing.

* * * * *